United States Patent
Opal et al.

[11] 3,753,155
[45] Aug. 14, 1973

[54] APPARATUS FOR CENTER-REFERENCED PULSE WIDTH MODULATION

[75] Inventors: Kenneth E. Opal, Oakmont; Charles R. Kelly, Murrysville, both of Pa.

[73] Assignee: Power Control Corporation, Pittsburgh, Pa.

[22] Filed: Jan. 21, 1972

[21] Appl. No.: 219,732

[52] U.S. Cl. .................. 332/9 R, 307/265, 318/341, 328/58
[51] Int. Cl. ............................................. H03k 7/08
[58] Field of Search .............. 332/9 R, 9 T, 11 D; 328/58; 307/265; 325/142; 318/341

[56] References Cited
UNITED STATES PATENTS

| | | |
|---|---|---|
| 3,169,232 | 2/1965 | Engman et al. .................. 332/9 T |
| 3,551,851 | 12/1970 | Engel .............................. 307/265 X |
| 3,260,912 | 7/1966 | Gregory ........................... 318/341 |
| 3,513,400 | 5/1970 | Russell ............................ 332/9 T X |
| 3,246,247 | 4/1966 | Grindle ........................... 332/9 R |

Primary Examiner—Alfred L. Brody
Attorney—Brown, Murray, Flick & Peckham

[57] ABSTRACT

Center-referenced pulse width modulation is accomplished by turning on a bistable element when an initial step sweep signal reaches a voltage reference level during the ON period of an applied gating pulse and turning the bistable element OFF during the OFF period of the gating pulse after a time interval complementary to the ON period of the bistable element preceding the gating pulse center.

8 Claims, 6 Drawing Figures

APPARATUS FOR CENTER-REFERENCED PULSE WIDTH MODULATION

CROSS-REFERENCES TO RELATED APPLICATIONS

1. Application Ser. No. 219,704, filed Jan. 21, 1972 and entitled "Method and Apparatus for Providing Efficient and Stable Power Inversion with Voltage and Frequency Control" and 2. Application Ser. No. 219,733, filed Jan. 21, 1972 and entitled "Method and Apparatus for Pulse Width Modulation with Variable Frequency Modes."

BACKGROUND OF THE INVENTION

Although the invention may have general application, it is particularly useful in the system of the type described in copending application constituting Reference (1). In this system, the pulse width modulated output pulses (referred to as MP) are utilized to control thyristor gates in an inverter which develops three-phase alternating current motor drive signals. In a system of this type, the smoothness of the control depends upon how closely the pulse modulated output signals can approach the ultimate drive which is a sinusoid across the motor load.

It has been found that the conventional approach of pulse width modulation where the width is referenced at the beginning of the gating period, as is discussed more fully in copending application constituting Reference (2) above, does not permit a sufficient degree of control to make it possible to closely approach the sinusoidal output signal across the motor windings.

Another limiting factor in the conventional approach has been that the translation of voltage into pulse width for varying output frequency conditions has not, heretofore, been very stable. Thus, if the frequency reference varies somewhat, an error results in the resulting pulse width so that the average value of the modulated pulse does not precisely correspond to the input voltage reference.

SUMMARY OF THE INVENTION

According to the basic method of the invention, the ON to OFF transition of the gating pulse, considered herein to be the center of the gating pulse period (although it need not be the time center), is used as a modulation reference rather than the start of the gating pulse ON period. An initial step sweep signal is generated as soon as the gating pulse is ON and is compared to a voltage reference corresponding to maximum voltage, and an ON-setting pulse is generated to turn ON a bistable element (MP) which produces the modulated output pulse. This, then, occurs at a time preceding the center reference by an amount proportional to the input voltage reference (Vout).

As soon as the output modulated pulse is ON, an end modulation period control is actuated which develops a sweep end signal having an initial value at the center-reference time corresponding to the amount of time the modulated pulse (MP) has been ON preceding the center reference. The sweep end signal then decreases during the period following the ON-OFF transition of the gating pulse (GP) until it falls to a reference level such as ground or zero volts. This, then, marks the time for turning OFF the modulated pulse (MP).

The modulated pulse is fed back to a difference integrating circuit which also receives the voltage output reference (Vout) to develop a signal which controls the initial step level when the gating pulse first goes ON. In this manner, the output pulse width is referenced to the gating pulse center (ON-OFF transition) and the initial step is 37 servoed" until the difference between the output voltage reference and the average of the modulated pulse becomes zero. Thus, if an error in the frequency reference exists, it is compensated for by a change in the initial step level so that the pulse width of the modulated output pulse has an average value exactly corresponding to the desired voltage output (Vout).

The above and other objects and features of the invention will become apparent from the following detailed description taken in connection with the accompanying drawings which form a part of this specification, and in which.

Figure 1:
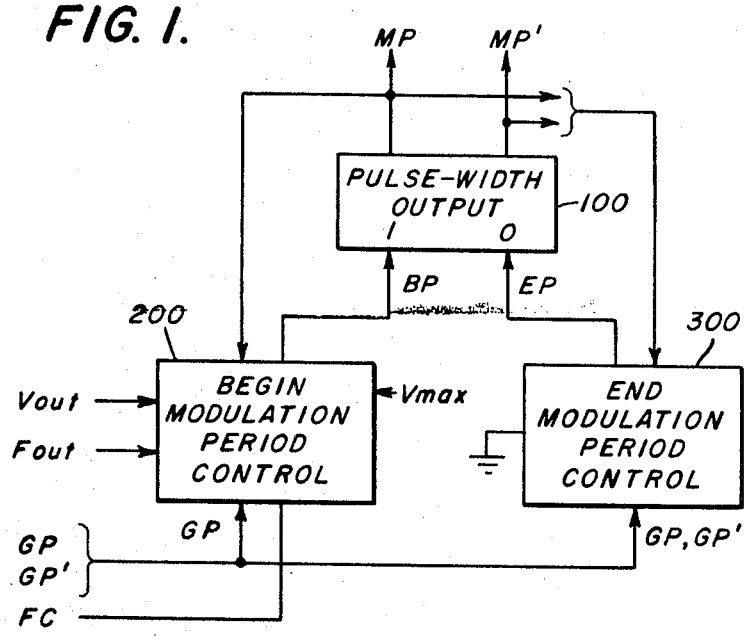
FIG. 1 is a block diagram of a pulse width modulator according to the invention.

As noted in FIG. 1, modulated output pulses MP and the complements thereof (MP') are produced by a pulse width output circuit 100 which is a bistable element having 1-setting and 0-setting input circuits. Representations of the desired output voltage (Vout) and the output frequency (Fout) are applied to a control circuit 200 which generates an output signal pulse BP marking the beginning of the pulse modulation period. Pulse BP is applied to the 1-setting input of output circuit 100 to turn it ON so that signal MP assumes an ON or "true" state as soon as signal BP is applied. Control 200 also receives representations of the gating pulse (GP, GP') and, in a system of the type described in copending application constituting Reference (2) above, also receives a frequency range control signal FC. In addition, a representation of the maximum output voltage (Vmax) is applied to control circuit 200.

After signal MP has been turned ON, control 300 becomes operative. The basic function of control 300 is to develop an end pulse EP to turn OFF output 100 at the proper time. Several methods of control will be discussed in the following. Basically, the function of control 300 is to measure the duration of the ON state of signal MP preceding the center reference and to then measure a corresponding time interval following the center reference. This means that, if it is desired to modulate pulse MP precisely about the center reference with even distribution, the ON period of MP preceding the center reference is made to be exactly equal to the ON period of MP following the center reference. Variations in this theme, however, are possible according to the invention.

Figure 2:
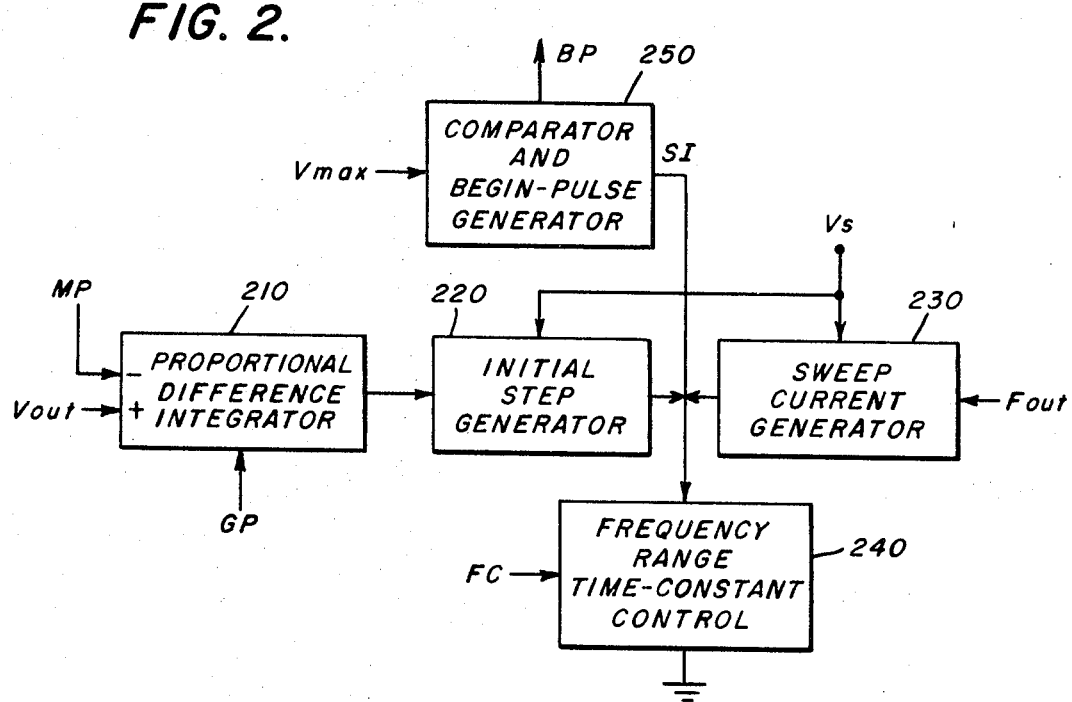
FIG. 2 is a block diagram of suitable means for performing the function of the begin modulation period control 200 of FIG. 1.
Figure 4:
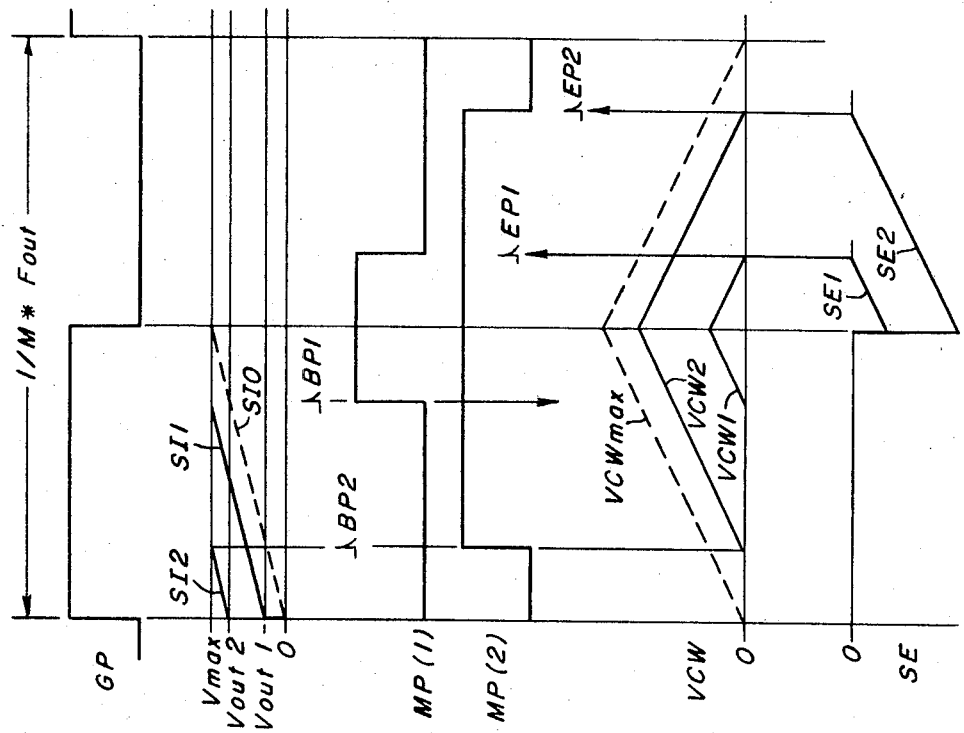

The method of operation by which the invention produces the beginning pulse BP will now be considered with reference to FIGS. 2 and 4. When gating pulse GP first goes ON, an initial step or voltage level is generated by generator 220 corresponding to the voltage output reference (Vout). In FIG. 4, two different initial levels are shown corresponding to a first voltage output reference (Vout1) (approximately one-quarter of Vmax) and a second voltage output reference signal Vout2 (approximately three-quarters of Vmax). Considering first the one-quarter reference signal Vout1), it will be noted that the initial step is approximately one-quarter of Vmax and that then the function of sweep current generator 230 comes into operation to cause sweep signal SI1 to increase linearly until the level of SI1 reaches Vmax. In the preferred embodiment of the invention, the initial step is "servoed" through the operation of proportional difference integrator 210 which receives a feedback signal representing MP. In the representation of FIG. 4, however, it is assumed that the frequency reference is precise and stable and that the feedback is not necessary for this case. Thus, a reference SI0 is shown which rises from an initial point of zero volts and intersects Vmax at the time gating pulse GP turns OFF. For the proper operation of the invention, the time constant for signal SI0 is changed in relationship to the ON period of pulse GP as frequency changes. This function is performed by means 240 of FIG. 2.

It will be noted that the period for the gating pulse GP is designated as 1/M*Fout which signifies that, where a multiple of the output frequency is utilized as the pulse rate for MP, appropriate adjustment in the time constant control 240 in FIG. 2 must be made. This multiple is represented by a frequency code FC applied to control 240 and its function will be more particularly described with reference to FIG. 2A below. When signal SI intersects the Vmax reference line, a begin pulse BP is generated. Thus, in the case of SI1, the intersection produces a begin pulse BP1 which turns ON a signal referenced as MP(1). In a similar manner, a begin pulse BP2 is generated when an initial sweep SI2 (for Vout2) intersects Vmax and this turns ON a signal MP(2). Thus, the time signal MP is turned ON, measured from the center reference, is proportional to the voltage output reference Vout.

Figure 2A:
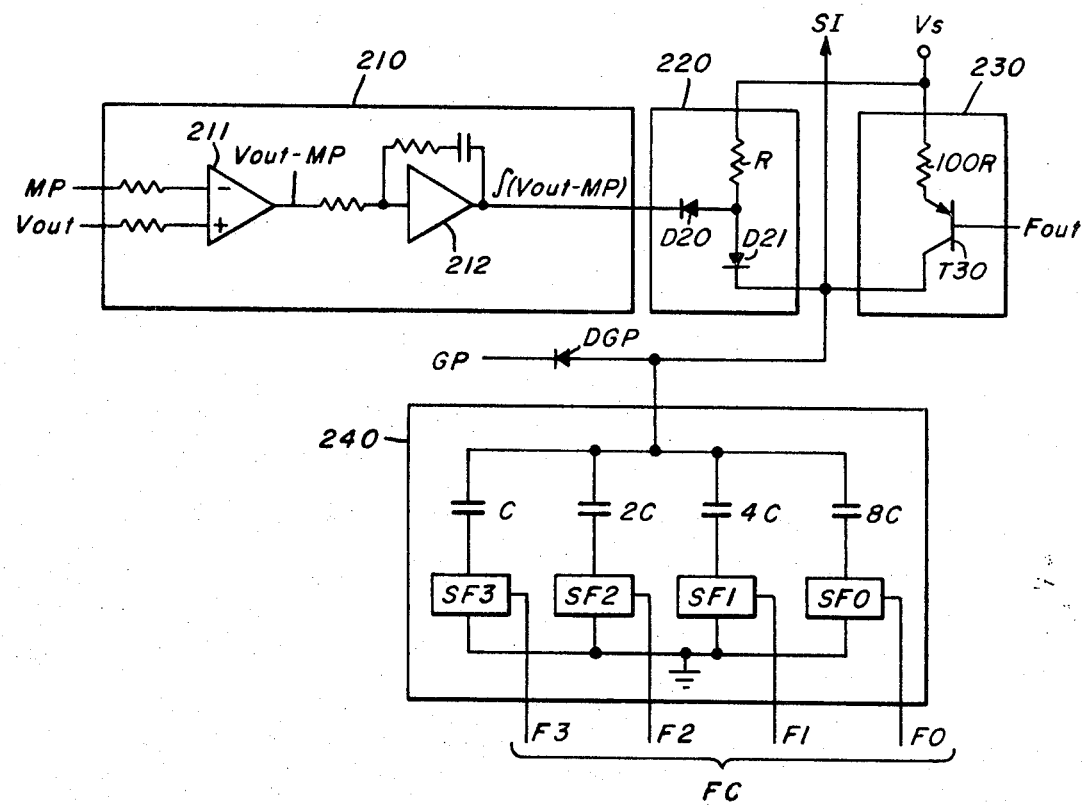
FIG. 2A is a schematic diagram showing a specific arrangement of circuits for accomplishing the function of means 200 of FIG. 1.
Figure 3:
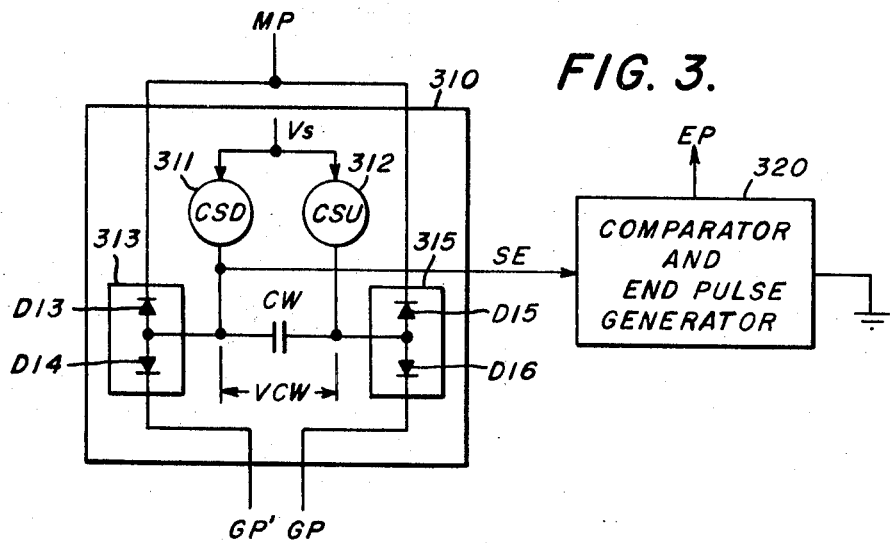
FIG. 3 is a schematic diagram of a circuit for performing the function of end modulation period control 300 of FIG. 1.

Before considering the specific circuit arrangement of FIG. 2A, the basic method of terminating the modulation period will be considered with reference to FIGS. 3 and 4. In FIG. 3, a circuit 310 is shown producing a signal SE which is the previously-mentioned sweep-end signal. The initial level of signal SE is determined during the period preceding the center reference when pulse MP is ON. Consider first the case of MP(1). Specifically considering circuit 310, when signals MP and GP are both ON preceding the center reference, a capacitor CW develops an output voltage referenced as VCW1 for MP(1) which increases until signal GP goes OFF. The gating of current to capacitor CW is controlled through diodes D15 and D16 in a gate 315 so that both signals MP and GP must be ON in order for current to pass through constant current source CSU referenced as 312 to capacitor CW. This charging establishes the initial reference of SE1 which is clamped at ground or zero volts during the period preceding the center reference, by the action of gating circuit 313, where diodes D13 and D14 receive signals MP and GP', respectively. As soon as signal GP turns OFF, ground is removed from the negative terminal of capacitor CW so that the negative level of SE1 exactly corresponds to the positive level of voltage VCW1 at the center reference point.

During the period following the center reference, when GP is OFF and MP is still ON, signal SE1 decreases in level through CSD (loses its negative reference value) until it intersects the zero reference. At this time, comparator 320 which is referenced to ground produces signal pulse EP1 which turns OFF element MP. The operation thus far described relates to the generation of a pulse precisely modulated about the center reference with equal distribution of the pulse to the left and the right thereof and further is based upon the assumption that the time constant of the initial sweep SI is precisely related to the gating pulse. A similar operation, under the same conditions, is found in the case where Vout2 is approximately three-quarters scale and pulse BP2 is generated when the initial sweep SI2 crosses Vmax turning ON signal MP(2). This initiates the charging of capacitor CW and the development of signal VCW2 which establishes the initial level of sweep-end signal SE2 at the center reference. When signal SE2 then returns to zero volts, the end signal pulse EP2 is generated turning OFF signal MP(2).

Figure 5:
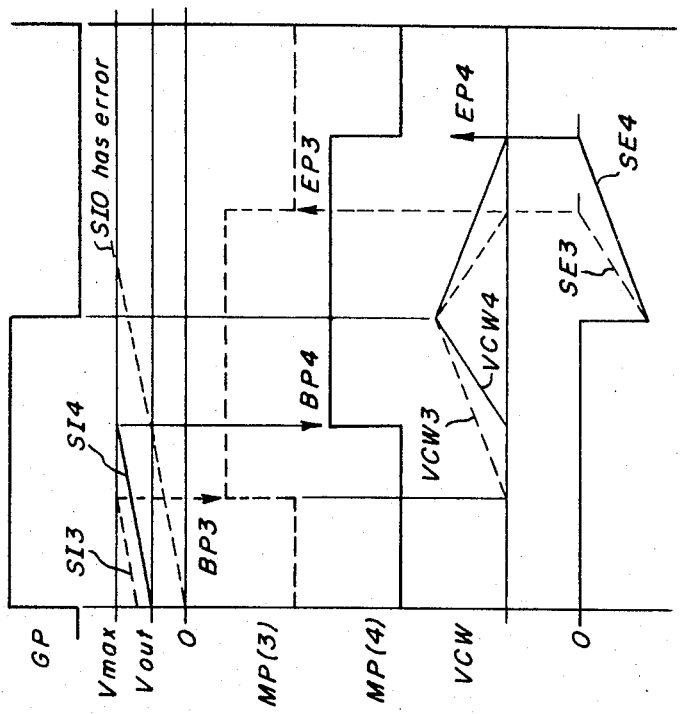
FIGS. 4 and 5 are waveforms utilized to describe the operation of the invention.

Before considering the mode of operation set forth in FIG. 5, where an unstable frequency reference is assumed and the difference integrating feedback comes into play, the specific circuit arrangement of FIG. 2A will be considered to further clarify how this method of operation is performed.

Referring now to FIG. 2A, it will be noted that signals MP and Vout are applied through separate input resistors to a difference amplifier 211. The output signal of amplifier 211 is referenced as Vout-MP and is supplied to the input resistor of a proportional integrating amplifier 212 which produces an output signal corresponding to the integral of the difference Vout-MP. This integrated difference signal is applied to diode D20 in initial step generator 220. Diode D20 is connected to a second diode D21 which has its cathode coupled to the frequency range time constant control circuit 240 which will be explained in detail below. Diode D21 provides charging current supplied through resistor R from a source VS for the selected capacitor in time constant control circuit 240. It is at the junction of diode D21 and circuit 240 that signal SI is generated.

Gating pulse GP is applied through a diode DGP to clamp the level of output signal SI to ground or zero volts when the gating pulse is OFF. As soon as the gating pulse GP turns ON, the capacitor selected in circuit 240 is charged to an initial step corresponding to the integrated difference between Vout and modulated pulse MP. This integrated difference signal is developed over a period of time which is relatively long compared to the gating pulse period so that it has the effect of averaging out the level of the modulated pulse MP. When the system is stable, the difference signal Vout-MP becomes essentially zero so that the integrated output signal produced by amplifier 212 no longer changes. It is the stable condition which is set forth in FIG. 5. As soon as the level of signal SI reaches the integrated difference signal level, diode D21 ceases conducting and the sweep generator circuit 230 becomes operative. It will be noted that the charging resistor in generator 230 is represented as 100R to represent the fact that its impedance is approximately one hundred times or possibly more than that of resistor R in circuit 220. Thus, the initial step time constant is very small compared to the time constant for generating signal SI thereafter, and is assumed to be substantially instantaneous. Circuit 230 operates to provide constant current, in a well-known manner, by applying a frequency voltage reference Fout to the base of a transistor T30.

Four capacitors referenced as C, 2C, 4C and 8C are shown in circuit 240 corresponding to four frequency ranges coded as F3, F2, F1 and F0. The purpose of this frequency range switching is fully set forth in copending application constituting Reference (2) above. For present purposes, it is sufficient to take note of the fact that the capacitor selected corresponds to the frequency multiple which is utilized in generating gating pulses GP. In the specific example of circuit 240 as shown, mode F0 defines a time constant which is eight times as long as mode F3 since the value of the capacitor associated with mode F0 is eight times that of the capacitor used for mode F3. The reason for this is that, during mode F3, eight times as many pulses are generated during each output frequency period as during mode F0. In a similar manner, mode F1 controls a pulse rate twice that of mode F0 so that the time constant utilizing capacitor 4C is half of that used for mode F0 and mode F2 utilizes a capacitor 2C so that the time constant utilized therein is one-quarter that used during mode F0. A series of switches SF0, SF1, SF2 and SF3 are utilized to provide the appropriate capacitor charging path.

Referring now to FIG. 5, it will be noted that the zero voltage reference sweep SI0 has an error since it does not precisely intersect the center reference time. It will also be noted that in the two examples of pulse modulation referenced as MP(3) and MP(4), the pulse modulation is off-center. In the case of MP(3), it is shifted to the left, whereas in the case of signal MP(4), it is shifted to the right. This shifting to the left or to the right is accomplished by suitably adjusting the current level provided by constant current sources 311 and 312 shown in FIG. 3. If source CSU(312) charges capacitor CW at a rate slower than source CSD(311) discharges the capacitor, the result is a left shifting of the output pulse MP as in the case of MP(3) whereas if source CSU provides more charging current than source CSD, the resulting output pulse is right shifted.

The final output pulse width is stabilized so that the average pulse level during the period represented in FIG. 5 is exactly equal to Vout. It will be seen in the example of FIG. 5 that Vout is selected to be precisely halfway between 0 and Vmax so that, if the area under both pulses MP(3) and MP(4) is examined, it will be found to be exactly equal to one-half of Vmax. Thus, the servo feedback of signal MP makes it possible to precisely produce the desired pulse width without accurate frequency referencing. However, it is preferred in the practice of the invention to utilize both the integrating difference function and the utilization of a frequency reference Fout as applied to circuit 230, to increase the circuit's speed of response.

From the foregoing description, it should now be apparent that the invention provides a novel method for center-reference modulation where the center is established by the ON or OFF transition of a gating pulse. It has been shown that off-center modulation to the left or to the right of the center reference may be performed according to the invention and that precise compensation for changes in output frequency may be compensated for through the utilization of a differencing feedback which is integrated until the average pulse width output is precisely equal to the voltage output reference.

I claim as my invention:

1. In a pulse width modulation system, means for providing a series of gating pulses of predetermined frequency, means for producing a first signal pulse at a time after the start of a gating pulse inversely related to a reference voltage, means for producing a second signal pulse at a time after termination of the gating pulse substantially equal to the time between the occurrence of the first signal pulse and the termination of the gating pulse, and means responsive to said signal pulses for starting an output pulse upon occurrence of a first signal pulse and terminating the output pulse upon occurrence of a second signal pulse, whereby the width of the output pulses is proportional to said reference voltage.

2. The system of claim 1 in which the means responsive to the signal pulses is a bistable element adapted to be turned ON by application of the first signal pulse and turned OFF by application of the second signal pulse.

3. The system of claim 1 including means for producing a timing signal in response to the start of a gating pulse, the duration of said timing signal being inversely proportional to the reference voltage, and means operative upon completion of the timing signal for producing said first signal pulse.

4. The system of claim 3 in which said timing signal means includes means for setting an initial voltage level proportional to said reference voltage, means for applying a linearly rising signal to said initial level, and means for producing said first signal pulse when said linearly rising signal equals a constant maximum voltage level.

5. The system of claim 1 including means responsive to termination of a gating pulse for producing a timing signal, the duration of said timing signal being substantially equal to the duration of the output pulse from its start until termination of the gating pulse, and means operative upon completion of said timing signal for producing said second signal pulse.

6. The system of claim 5 in which said timing signal means includes a capacitor, means for charging said capacitor at a uniform rate during the period from the start of the output pulse until the termination of the gating pulse, means for thereafter discharging the capacitor at substantially the same rate, and means for producing said second signal pulse when the voltage of the capacitor falls to its initial value.

7. In a pulse width modulation system, means for providing a series of gating pulses, each of said pulses having a predetermined duration between the start and termination of the pulse, means for producing first and second signal pulses at substantially equal times before and after the termination of each gating pulse, means responsive to said signal pulses for starting an output pulse upon occurrence of the first signal pulse and terminating the output pulse upon occurrence of the second signal pulse, means for supplying a reference voltage and timing means for controlling the duration of said equal times in proportion to said reference voltage.

8. The system of claim 7 in which said timing means includes means for producing a first signal pulse at a time after the start of a gating pulse inversely proportional to the reference voltage, and means for measuring the time period between the occurrence of the first signal pulse and the termination of the gating pulse and for producing a second signal pulse at the end of an equal time after termination of the gating pulse.

* * * * *